US006980970B2

(12) United States Patent
Krueger et al.

(10) Patent No.: US 6,980,970 B2

(45) Date of Patent: Dec. 27, 2005

(54) SECURE NETWORKED TRANSACTION SYSTEM

(75) Inventors: Scott Krueger, Palm Springs, CA (US); Daniel Goodman, N. Miami Beach, FL (US)

(73) Assignee: Debit.Net, Inc., North Miami Beach, FL (US)

(*) Notice: Subject to any disclaimer, the term of this patent is extended or adjusted under 35 U.S.C. 154(b) by 1035 days.

(21) Appl. No.: 09/737,080

(22) Filed: Dec. 14, 2000

(65) Prior Publication Data

US 2002/0077837 A1 Jun. 20, 2002

Related U.S. Application Data

(60) Provisional application No. 60/171,229, filed on Dec. 16, 1999.

(51) Int. Cl.[7] .................. G06Q 40/00

(52) U.S. Cl. .................. 705/39; 705/38; 705/64; 705/72; 705/74; 705/75

(58) Field of Search .................. 705/75, 74, 72, 705/64, 39, 38

(56) References Cited

U.S. PATENT DOCUMENTS

| | | | | |
|---|---|---|---|---|
| 5,732,136 A | | 3/1998 | Murphree et al. | |
| 5,745,886 A | * | 4/1998 | Rosen | 705/39 |
| 5,757,917 A | * | 5/1998 | Rose et al. | 705/79 |
| 5,768,385 A | * | 6/1998 | Simon | 705/69 |
| 5,809,144 A | * | 9/1998 | Sirbu et al. | 705/53 |
| 5,815,657 A | * | 9/1998 | Williams et al. | 713/200 |
| 5,826,245 A | | 10/1998 | Sandberg-Diment | |
| 5,870,456 A | | 2/1999 | Rogers | |
| 5,903,878 A | | 5/1999 | Talati et al. | |
| 5,920,847 A | | 7/1999 | Kolling et al. | |
| 5,937,394 A | * | 8/1999 | Wong et al. | 705/26 |
| 5,945,653 A | * | 8/1999 | Walker et al. | 235/380 |
| 5,956,695 A | | 9/1999 | Carrithers et al. | |
| 5,956,699 A | * | 9/1999 | Wong et al. | 705/39 |
| 5,983,207 A | * | 11/1999 | Turk et al. | 705/39 |
| 5,983,208 A | | 11/1999 | Haller et al. | |
| 5,987,140 A | | 11/1999 | Rowney et al. | |
| 5,991,738 A | | 11/1999 | Ogram | |
| 6,000,832 A | * | 12/1999 | Franklin et al. | 700/232 |
| 6,023,682 A | * | 2/2000 | Checchio | 705/18 |
| 6,029,150 A | * | 2/2000 | Kravitz | 705/39 |
| 6,047,268 A | * | 4/2000 | Bartoli et al. | 705/35 |
| 6,205,436 B1 | * | 3/2001 | Rosen | 705/65 |
| 6,254,000 B1 | * | 7/2001 | Degen et al. | 235/380 |
| 6,282,522 B1 | * | 8/2001 | Davis et al. | 705/41 |
| 6,477,578 B1 | * | 11/2002 | Mhoon | 709/229 |
| 6,484,154 B1 | * | 11/2002 | Mitsuishi et al. | 705/64 |
| 6,636,833 B1 | * | 10/2003 | Flitcroft et al. | 705/1 |
| 6,789,068 B1 | * | 9/2004 | Blaze et al. | 705/64 |
| 6,834,271 B1 | * | 12/2004 | Hodgson et al. | 705/72 |
| 6,910,023 B1 | * | 6/2005 | Schibi | 705/64 |
| 2001/0025271 A1 | * | 9/2001 | Allen | 705/65 |

FOREIGN PATENT DOCUMENTS

| | | | | |
|---|---|---|---|---|
| JP | 02002157534 A | * | 5/2002 | G06F 17/60 |
| WO | WO 92/07436 | * | 4/1992 | H04K 1/00 |

OTHER PUBLICATIONS

DFW.com webpage Nescrow Technologies, Inc. Meets with US dept. of Commerce Oct. 27, 2000 3 pages.*

Augusta Chronicle, August, GA.-Based Communications Firm Aligns with Kansas Company, Sep. 21, 2000.

* cited by examiner

*Primary Examiner*—Charles Kyle

(74) *Attorney, Agent, or Firm*—Anthony R. Barkume, P.C.

(57) ABSTRACT

A method and system for approval by a verification computer of an online transaction between a user computer and a merchant computer over the Internet. The user computer transmits a transaction request to the merchant computer, which may include a product to be purchased and the payment amount. The merchant computer transmits to the verification computer a verification request including a first data string associated with the payment card (such as a debit card account number or a portion thereof) and the payment amount. The verification request is stored at the verification computer with a transaction identifier and a verification data string, which are also transmitted to the merchant computer. The merchant computer stores the verification data string as an expected verification data string and the transaction identifier, transmits the transaction identifier to the user computer, and the user computer transmits the transaction identifier to the verification computer. This may be accomplished by the merchant computer redirecting the web browser of the user computer to the verification computer. The user computer also transmits a second data string associated with the payment card (such as the PIN for the debit card) after being requested by the verification computer. The verification computer uses the transaction identifier received via the user computer to retrieve the verification request previously stored with that received transaction identifier, and then it performs a verification step by using the first data string associated with the payment card retrieved from storage and the second data string associated with the payment card received from the user computer to verify if the transaction should be approved, e.g. by determining if an account associated with the payment card is sufficient to cover the payment amount in the verification request. The verification computer will, upon successful verification that the transaction should be approved, transmit a verification approval message to the user computer, which includes the transaction identifier and the verification data string associated therewith as a confirmation verification data string, and the user computer transmits the verification approval message to the merchant computer. This may also be accomplished by the verification computer redirecting the web browser of the user computer to the merchant computer with the appropriate data. The merchant computer uses the transaction identifier in the verification approval message to retrieve an expected verification data string it had previously stored. The merchant computer then compares the expected verification data string with the confirmation verification data string from the verification approval message and indicates that the transaction has been approved if the comparison is positive.

113 Claims, 7 Drawing Sheets

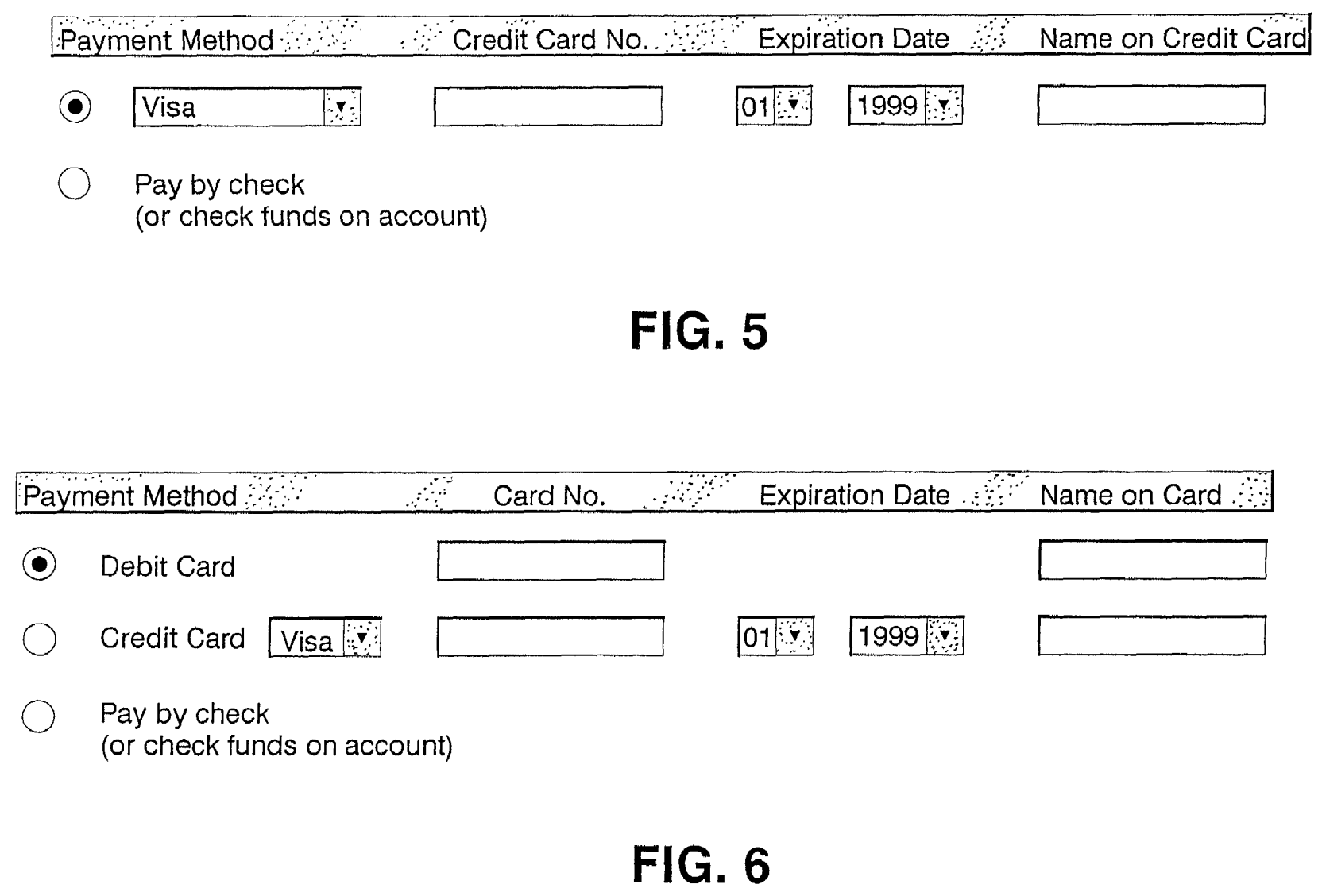

Payment Method
Credit Card No.
Expiration Date
Name on Credit Card
Visa
01
1999
Pay by check
(or check funds on account)

FIG. 5

Payment Method
Card No.
Expiration Date
Name on Card
Debit Card
Credit Card
Visa
01
1999
Pay by check
(or check funds on account)

FIG. 6

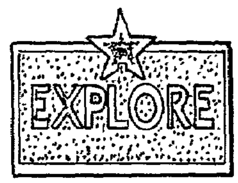
FIG. 8a
NYCE
FIG. 8b
Maestro
FIG. 8c
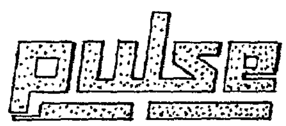
FIG. 8d
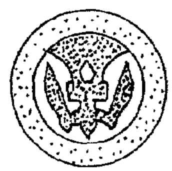
FIG. 8e
MPACT
FIG. 8f
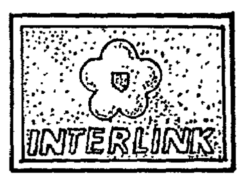
FIG. 8g
MAC
FIG. 8h
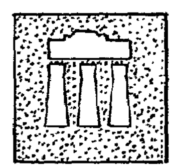
FIG. 8i
HONOR
FIG. 8j Advertisement Area Merchant:

Transaction Amount:

Enter the Expiration Date of the card you provided to the merchant

Enter the PIN number for the Debit Card

Select the first graphic from the following list that matches those on the back of your card.

EXPLORE

NYCE

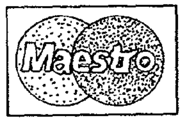

pulse

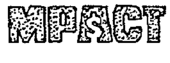

INTERLINK

MAC

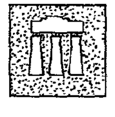

HONOR

Cancel and Return to the Previous Merchant Page

Submit and Charge My Card

Advertisement Area

FIG. 9

SECURE NETWORKED TRANSACTION SYSTEM

This application claims the benefit of Provisional Application No. 60/171,229, filed Dec. 16, 1999.

BACKGROUND OF THE INVENTION

The present invention relates to systems that allow debit cards, credit cards, Direct Check/ACH and other financial transaction instruments to be used in networked purchasing environments between a merchant, customer, and a third party processor. The third party processor acts as an intermediary or clearinghouse for transactions.

Debit cards such as those typically provided by financial institutions such as banks or credit unions require the card to be encoded or the system to be encoded to recognize the card/Personal Identification Number (PIN) combination. When used at an ATM or point of sale terminal, the system contacts the financial institution or a representative thereof with the user's account number and PIN number. The account is checked to determine whether sufficient funds exist for the purchase or cash request. The system records the parameters of the transaction to make the updates to the accounts such that the funds are transferred between parties of the transaction.

Prior art systems utilize various data encryption methods to secure the transmission of the customer's debit card/account number, customer's PIN number, the merchant's ID or code, to the various banking and transaction clearing systems that are checked at the point of sale such that an approval number is received by the merchant indicating that the transaction has been approved. The point-of-sale system or a separate card reader is used to connect directly to the clearing system.

While this type of transaction allows a user to directly pay for purchases at the point of sale, it allows the potential for an unscrupulous merchant, or a party intercepting communications to have access to the user's account number and PIN number.

In an e-commerce environment, the user accesses a merchants web site, indicates the items to be purchased and is requested to supply some means to pay for the items during the checkout process. The user typically enters the credit card number and the expiration date of the card to secure the credit transaction and shipping preferences. The merchant receives this information and generates a request that is transmitted to a credit clearing system that requests approval for the purchase and transfers back an approval code to the merchant. The merchant may at this point indicates to the customer that the purchase was successful and supplies an approval page to the customer.

Since the transaction occurs over the Internet, users have concerns over the privacy and security of the information entered. These privacy and security issues limit the amount of customers that use these forms of commerce at this time. Businesses have been trying to generate more robust security mechanisms to calm nervous customers, but these system still require the customer to provide the complete billing information to the merchant to complete the sale. Robust encryption processes help to reduce the customer's anxiety to some extent.

While credit cards are commonly used in point-of sale and on-line transactions, the merchant is charged a variable fee for the transaction by the credit authorization system based on the risk of the purchase. A higher rate for example, may be charged where the user is not at the point of sale, but is instead making the purchase at a remote location via a computer. The potential for fraud may be increased when the customer is not visible. Since the credit card company has power to act against unscrupulous merchants and to protect the consumer against fraud by merchants, customers are less concerned about the credit transaction that they would be regarding a debit transaction.

In contrast to credit purchases, there are no intermediaries to protect a customer when a debit transaction occurs. Debit transactions in contrast cause direct modifications to the clients bank account or financial assets held in a financial institution. The customer is vulnerable to direct funds transfer and withdrawal activity if someone performs these types of transactions without the customer's knowledge.

What is desired therefore is a system for allowing a customer to purchase items where the customer is not required to give the PIN number of the debit card to a merchant during an on-line purchase. It is another object of the present invention that the merchant or any party intercepting a communication between the customer and merchant, never has access to the customer's PIN number throughout the transaction. It is a further object of the present invention that all the information required to complete a transaction never exists in one transmission on the public network.

It is an object of the invention to provide a system where a third party trusted verification system is contacted during the purchase process by the merchant to request the processing of a customer's debit transaction where the merchant only knows the card number (or a portion of it). The trusted verification system separately receives the PIN number from the customer and processes the transaction with the credit/debit processing system. The functionality performed by the trusted verification system may be performed by the debit card organization/bank directly.

SUMMARY OF THE INVENTION

The present invention, in summary form, allows a customer at a customer computing device, interacting with a merchant's computer system/web site, to buy an item with a Debit/Check or credit card. The merchant transmits details of the transaction to a trusted third party verification system (TVS) including card number, merchant number, and transaction amount. The verification system returns a transaction ID and unique verification data string to the merchant. The merchant redirects the customer to the verification system site, passing the transaction ID as part of the communications address. The verification system interacts with the user to acquire the PIN number for the debit/check card, or the expiration date and/or the CVV2 number for a credit card. Using the passed-in transaction ID and the acquired password (PIN), the verification system retrieves the merchant information from it's database, and provides the merchant number, card number, pin and transaction amount to the gateway of the Debit/Check card processing network. Upon retrieving a positive verification of the transaction success, the customer is redirected to the merchant site, passing the transaction ID and a unique verification as part of the redirection. The merchant's system compares the provided verification data string against the expected verification data string it had earlier received from the verification system. If they match, the merchant knows the transaction was successfully completed.

Thus, in particular, in one exemplary embodiment, provided is an internetworked computer system and method having at least one user computer, at least one merchant computer, and a verification computer interconnected to a computer network such as the Internet. The computers carry out a method of approving an online transaction in conjunction with a payment card associated with the user computer. The method includes the steps of the user computer transmitting a transaction request to the merchant computer, which may include information associated with a product to be purchased by the user computer and the payment amount associated with the product. The merchant computer then transmits a verification request to the verification computer, the verification request including a first data string associated with the payment card (such as a debit card account number) and optionally an indication of a payment amount associated with the transaction request. The verification request is then stored at the verification computer in association with a transaction identifier and a verification data string, and the transaction identifier and the verification data string are transmitted from the verification computer to the merchant computer. The merchant computer stores the verification data string as an expected verification data string and the transaction identifier. The merchant computer then transmits the transaction identifier to the user computer, and the user computer transmits the transaction identifier to the verification computer. This may be accomplished by the merchant computer redirecting the web browser of the user computer to the verification computer with the appropriate data. The user computer also transmits a second data string associated with the payment card (such as the PIN for the debit card) after being requested by the verification computer.

The verification computer uses the transaction identifier received via the user computer to retrieve the verification request previously stored with that received transaction identifier, and then it performs a verification step by using the first data string associated with the payment card retrieved from storage and the second data string associated with the payment card received from the user computer to verify if the transaction should be approved, e.g. by determining if an account associated with the payment card is sufficient to cover the payment amount in the verification request.

The verification computer will, upon successful verification that the transaction should be approved, transmit a verification approval message to the user computer, which includes the transaction identifier and the verification data string associated therewith as a confirmation verification data string, and the user computer transmits the verification approval message to the merchant computer. This may also be accomplished by the verification computer redirecting the web browser of the user computer to the merchant computer with the appropriate data. The merchant computer uses the transaction identifier in the verification approval message to retrieve an expected verification data string it had previously stored. The merchant computer then compares the expected verification data string with the confirmation verification data string from the verification approval message and indicates that the transaction has been approved if the comparison is positive.

In the case where the payment card is a debit card, then the first data string is an account number associated with the debit card and the second data string is a PIN. In the case where the payment card is a credit card, then the first data string is an account number associated with the credit card and the second data string is an expiration date or the CVV2 number.

Optionally, the verification computer determines if an account associated with the payment card is sufficient to cover the payment amount in the verification request by communicating with a gateway computer associated with an existing credit approval system.

BRIEF DESCRIPTION OF THE DRAWING

FIG. 5 is a representation of a prior art credit processing fields for on-line transactions;

FIG. 6 is a representation of the debit card entry fields for on-line transactions of the present invention;

FIG. 8 shows the icons associated with a sampling of the various debit processing network members that exist;

FIG. 9 is a representation of an interface form for providing the PIN information that is delivered to a customer from the verification system.

DETAILED DESCRIPTION OF THE PREFERRED EMBODIMENT

Figure 1:
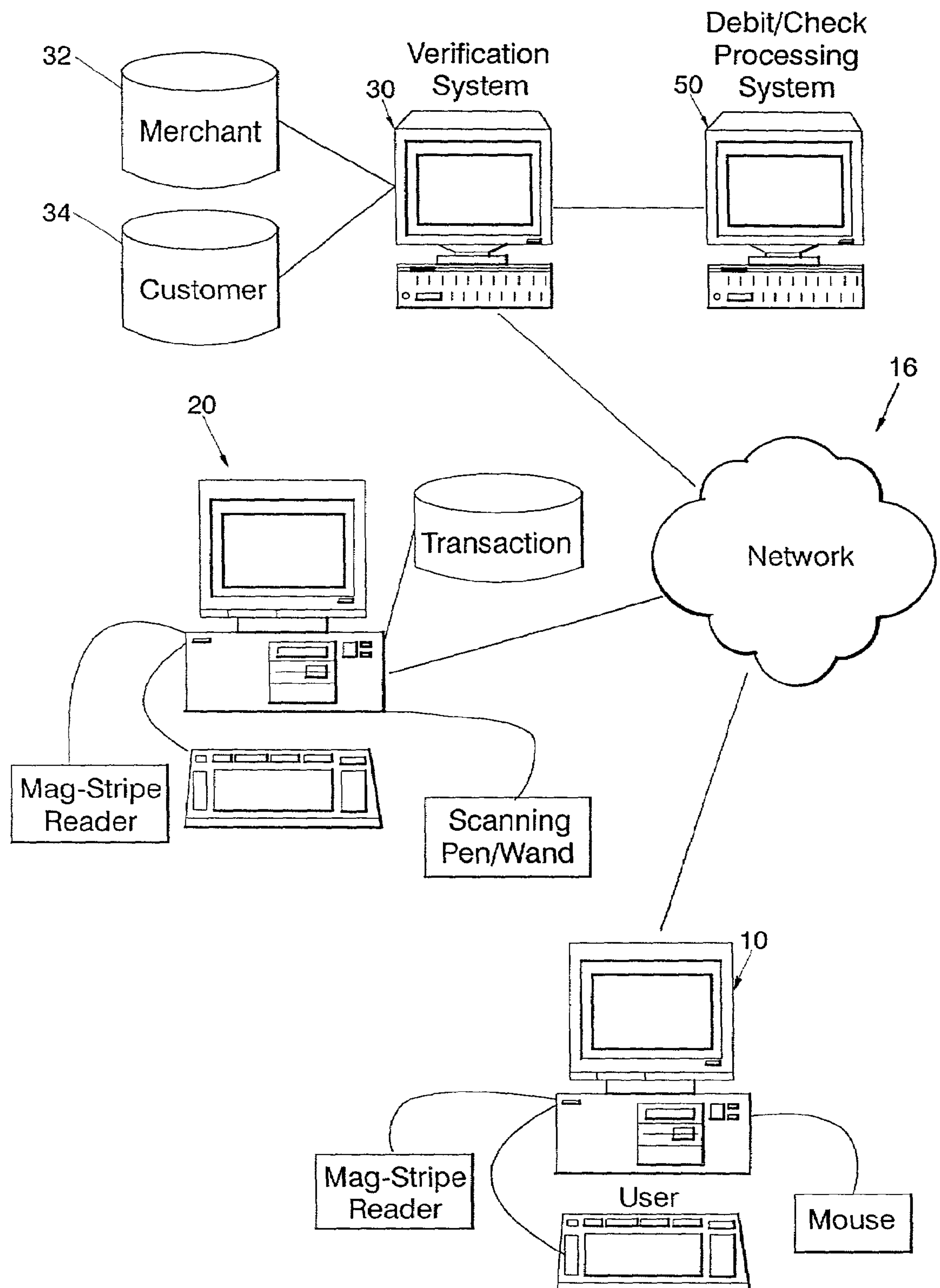
FIG. 1 is a representation of the system components of the present invention.

The present system will be described with regard to FIG. 1, for allowing a user to make purchases at a networked e-tailer or retail location using a payment card such as a debit card or credit card. In the preferred embodiment, the customer that wishes to purchase a product may access the web site of the merchant using a web enabled device such that the customer may access a purchasing interface provided by or for that merchant. The customer would typically use a desktop computer, set top box, or any other type of device capable of communications through a network. For example, a customer from a Pentium class computer with a display, keyboard, mouse and processor executing an operating system such as Windows CE, 95, 98, MAC O/S, or Linux or Unix with a communication connection to a network such as the Internet may execute a web browser such as Internet Explorer or Netscape to access the merchant's web site. Wireless and satellite communication devices may alternatively be used by the customer to communicate with the verification system and perform steps associated with completing the transactions associated with a purchase.

The merchant computer 20 may be a terminal connected to a network, a point of sale system, or a personal computer system, or server based system connected to a network that is capable of connecting to a merchant server web site. For Internet-based communications where a merchant web server is provided, the server may comprise any networked computing devices capable of serving interface programs that customers may access to indicate desired purchases. The merchant computer comprises communication means, storage means, and one or more processors to support the execution of the required processes. The merchant computer may optionally have one or more monitors, and input devices such as keyboard, mouse, and mag-stripe reader. The mag-stripe reader is also known as a card-swipe reader, or card-swipe device.

The verification system therefore is a networked computer system that comprises communications means for receiving requests from merchants and for communicating with customers during the purchase process. The communication means also permits the verification system to communicate with debit/credit card processing systems to process transactions for purchases. The verification system comprises memory means for retaining merchant records and customer records, and processor means for managing transactions.

Figure 2:
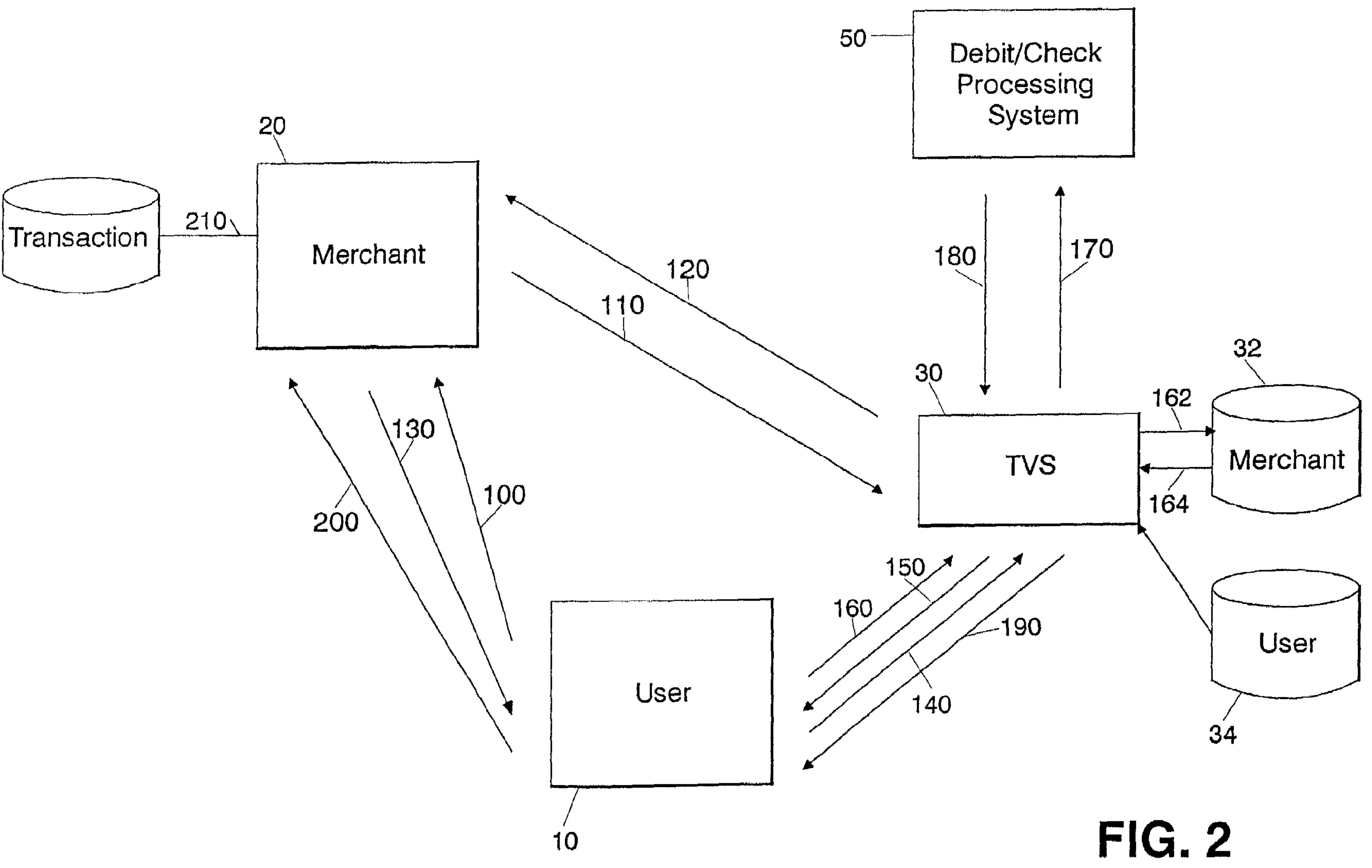
FIG. 2 is a process diagram of the method of the present invention.
Figure 3:
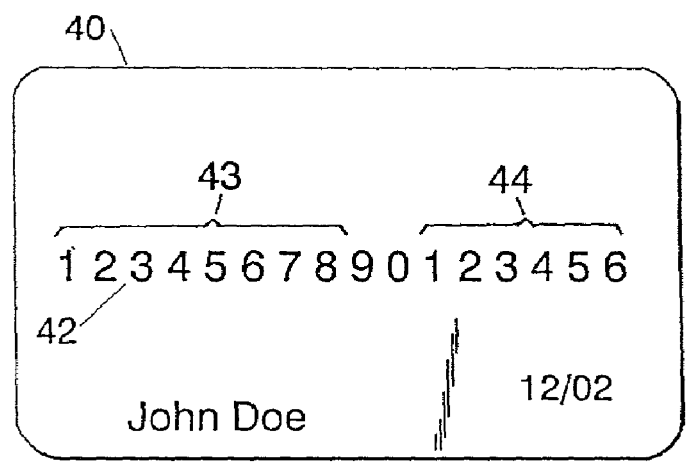
FIG. 3 is a representation of the front face of a debit card of the present invention.
Figure 4:
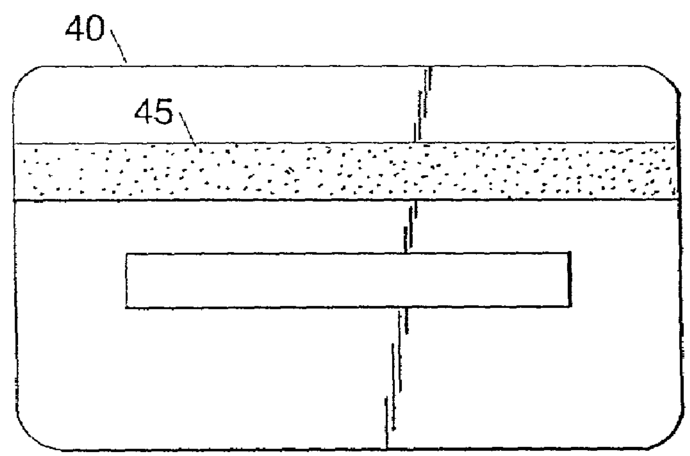
FIG. 4 a representation of the rear face of the debit card of the present invention.
Figure 7:
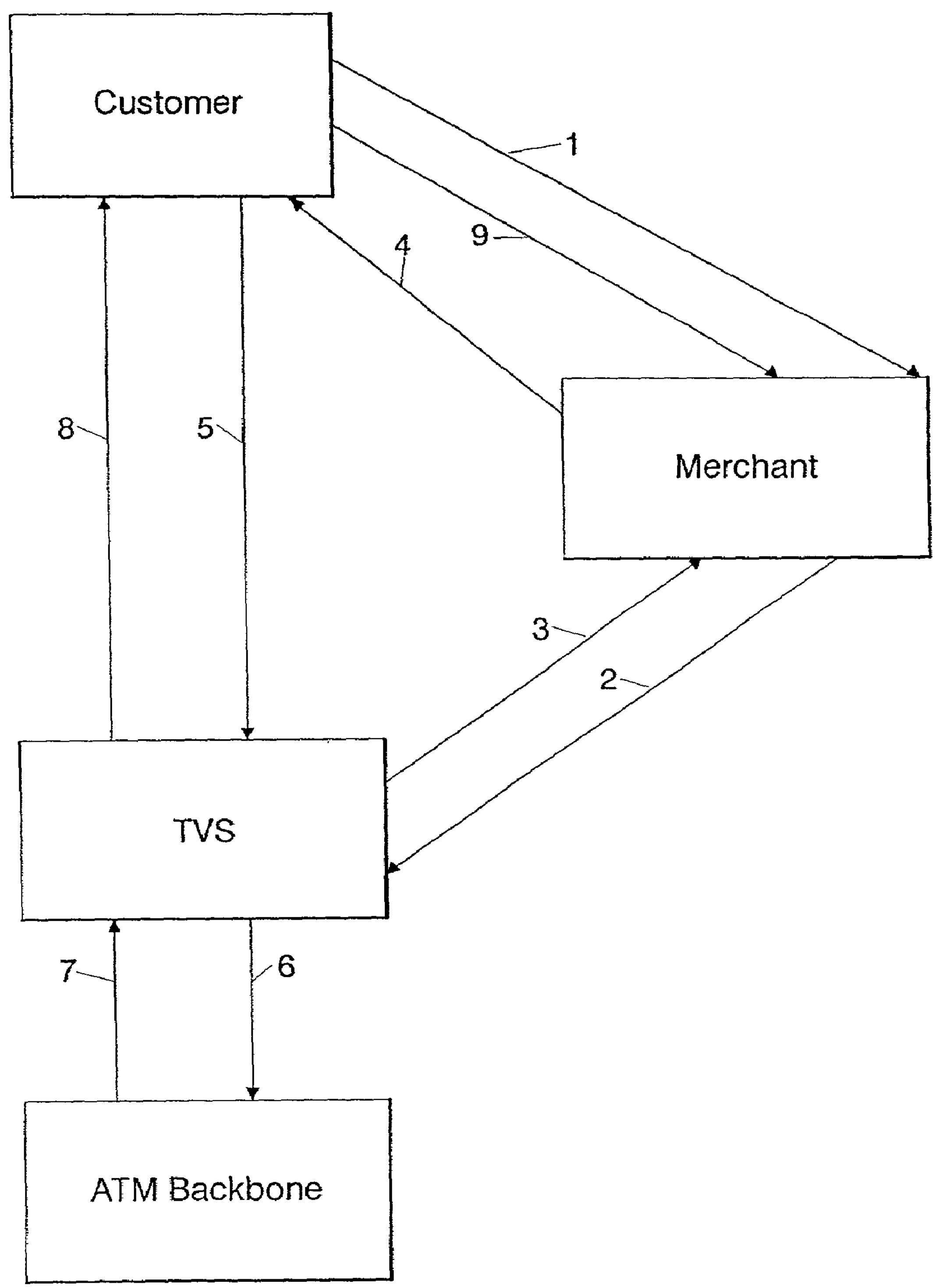
FIG. 7 is a process step diagram of the present invention.

The method of the present invention will now be described with regard to FIG. 2. A customer at a customer computing device such as a user computer, interacting with a merchant's computer 20 system/web site, decides to buy an item with a payment card such as a debit/check card or credit card 40 at step 100. The user computer sends a transaction request, which will include details of the desired item such as a description and the payment price, to the merchant computer. The transaction request will also include a first data string associated with the payment card, such as the debit card number. The merchant computer 20 transmits a verification request comprising details of the transaction to a trusted third party verification computer system (TVS) 30 at step 110. The verification request will include information such as the debit card account number 42 (see FIG. 3), merchant number (as determined from the merchant system) and the transaction amount. The verification computer 30 stores the verification request in association with a unique transaction identifier and verification data string that it has generated, and then returns the transaction identifier and verification data string to the merchant computer 20 at step 120. The merchant computer 20 then sends the transaction identifier to the verification computer via the user computer, for instance by issuing a redirect command to the user computer's web browser such that the user computer is redirected to the verification computer. The redirect command includes the passing of the transaction identifier that was received from the verification computer as part of the communications address (e.g. a parameter of a URL).

The verification computer receives the transaction identifier from the user computer and interacts with the user computer at step 150 to acquire the PIN number for the debit/check card 40 at step 160. That is, after receiving the transaction ID as part of the redirect, the verification computer will send a browser form to the user computer, inviting the user to enter the PIN as a second data string associated with the payment card. Using the passed-in transaction identifier and the acquired PIN (or the expiration date and/or CVV2 if the payment card is a credit card), the verification computer retrieves the merchant information from it's database 32 at steps 162 and 164, and may optionally retrieve records for the customer in a customer database 34 at step 166, and performs a verification process using the first data string, the second data string, and the transaction amount. The verification process may be performed externally by providing the merchant number, card number, PIN and transaction amount to the gateway of the Debit/Check card processing network 50 at step 170. Alternatively, the verification may be done internally if the verification computer is actually part of the credit network.

Upon retrieving a positive verification of the transaction success at step 180, the verification computer sends an approval message to the merchant computer via the user computer; i.e. the customer is redirected to the merchant computer at step 190, passing the transaction identifier and a verification data string as part of the redirection at step 200 back to the merchant computer. Alternatively, the merchant's system may receive a separate notification message from the verification system 30 with the approved transaction identifier and verification data string. The merchant's system compares the provided verification data string against the expected verification data string it had earlier received from the verification system. If they match, the merchant knows the transaction was completed.

The method derives additional security because the merchants never have enough pieces of information to complete the transaction by themselves. The security of acquiring the PIN is enhanced because the network transmission containing the PIN never contains the corresponding card number and vice versa. Using readily available secure transmission protocols further increase security of all network transmissions.

This method is unique in that the merchant or any party intercepting a communication never has the customer's PIN number. It is further unique because the Debit/Check card and PIN numbers were never transmitted together during any part of the network exchanges between any of the three parties.

The debit card may be any type of debit card currently recognized by some of the present transaction service providers. The debit card typically has embossed characters 42 for the financial institution 43 and account number 44 where the characters are raised above the front of the card (see FIG. 3) The most commonly quoted standards are the ISO/IEC 7810, 11, 12 and 13 series of standards. These standards are written for the credit and debit card market and so include information on the embossed characters on the cards as well as the track locations and information on the magnetic stripe that appears on the rear of the card 45. ISO/IEC 7811 has six parts with parts two and six specifically about low and high coercivity magnetic stripes. These standards include information on the magnetic properties that guarantee that the stripe can be read in a magnetic stripe reader in the U.S.A. as well as in Japan. The companion to the ISO/IEC 7811 series of standard is ISO/IEC 10 373. This document details the test methods for the ISO/IEC 7811 series of standards.

Debit cards are preferably processed by the verification system through the existing ATM backbone of service providers. There are several different ATM backbone networks, and many have reciprocity agreements, so one ATM can usually talk to the bank of another system. Some of the icons for the providers are displayed in FIG. 8. A merchant that uses the functionality of the present system would typically be provided applets or modified HTML forms that direct the processing of debit transactions. For example, a modified form such as shown in FIG. 6 would cause a transaction to be generated to contact the verification system through a first connection. Upon receiving the debit card information, the verification system may identify the appropriate ATM backbone to be contacted by interpreting the account number typed in by the customer and, or data read from the magnetic stripe of the debit card. A customer from a remote customer computer may be able to provide input to the merchant web page and the verification system using various hardware peripherals such as a mag-stripe reader or keyboard and mouse to enter the debit card number. If the customer is at a merchant location or on the merchants web site, the merchant or customer may select or choose the symbol of one of the ATM backbones indicated on the customer's card from the web page. FIG. 9 shows an web page that might be used by the customer to select the ATM system and to enter the PIN number. The merchant would have a similar form with the account number and without the PIN number. In cases where the user has a card not supported by the ATM or point of sale system, extra charges may be incurred when performing transactions with a card that does not belong to the preferred system of the ATM or point of sale system. For example, one card may be a member of Exchange, Plus, Interlink and CU Access. Another Debit card may be configured as a member of Honor, Interlink, and Cirrus.

Generic card readers at merchant locations are configured to read from any type of card. Visa and Mastercard for example, may perform analysis of the card to determine which financial institution holds the account and additionally determines the type of account. The verification system of the present invention may keep a database of card number to bank account number conversions to allow the verification system to bypass the processing steps on the Visa/MC network and go straight to the ATM backbone further reducing transaction costs to the system. For example, only the first time a customer used the verification system would the system go through the Visa, Mastercard clearinghouse. This could reduce the costs of transactions even further, enhancing profit margin or lowering costs to merchants or customers.

In the preferred embodiment, the user interface displayed on the customer's web browser upon redirect to the verification system comprises navigational buttons to allow the user to return to the merchant prior to completion of the transaction. The interface may have the icons for the various debit service ATM backbones, as shown in FIGS. 8 and 9, where the user may select the appropriate symbol for the transaction such that the transaction is completed with the best transaction rate for that card. If the user selects an incorrect icon or if the debit card is not supported by the system the user is informed that the transaction cannot be completed with this card. The customer may be permitted to enter another card number and account at this time if the user wishes to proceed with this transaction. The system will be able to reconcile a change in the card selected since the verification data string and transaction id are part of the current transaction. This will cause an update of the record stored in the database that was received by the TVS from the merchant.

If a user enters credit information into the debit field by mistake, the risk to the merchant is that someone really wanted to use a credit card. The system would be configured such that excess capability was available to serve our pages, and the interface would provide an easy mechanism for a user to backup to the merchant page to change the information entered to the correct field. One benefit might be that the user has now realized that the debit option is available and might change the card used for the purchase.

The following steps describe the process of purchasing via an Internet connection in more detail.

1. The customer goes to merchant's web page and decides to buy something. On the https:// page where they would normally enter a credit card, there is also an option for a Debit/Check card. The customer enters their card number, and clicks the purchase button (buy it, whatever, just like they do now).

2. Because it is a Debit Card purchase, the merchant establishes a communications channel with the verification system and sends the card number, merchant ID, and the transaction amount.

3. The verification system returns to the merchant a data block containing a session ID, and verification information.

4. The merchant redirects the customer's web browser to the verification system server, passing the transaction ID as part of the address.

5. The verification system looks up the transaction information corresponding to the transaction ID, and presents a page to the customer requesting the information to complete the transaction, such as the PIN number and optionally the symbol representing the ATM backbone processing network, and/or other information from the card.

6. The verification system forwards the combined transaction information to the ATM backbone for completion of the transaction.

7. The verification system gets verification/approval from the backbone.

8. The customer is redirected back to the merchant web site, passing the expected verification block to the merchant as part of the address.

9. The merchant compares the verification block to the one received during the initial communication with the verification system, and if they match, knows that the transaction was successful.

In this mode of operation, the merchant never gets the pin. The verification system is the trusted third party and performs the communications with the financial backbone networks.

Optionally, software may be installed on the customer's machine and run locally that will retrieve customer information such as the PIN, and then using further cryptography techniques, pass that information to the verification system.

The system of the present invention may also be used for credit card processes or any other type of transaction where a third party (the verification server) holds part of the transaction information. For example, where the expiration date is held by the verification server for credit card transactions. Another example would be where a portion of a prepaid debit card may be provided to a third party, such that when the card is used at a merchant location, only part of the account number is known to the merchant. The customer would provide the remainder of the account number during the verification of the second part of the transaction with the customer.

The system may be used for the monthly billing transactions for insurance companies, gas credit cards, phone bills (bells and cellular), even email from your cellphone provider. For example, your Cell-phone bill for the month of March has been mailed to address which has a link provided to the system of the present invention such as "Try our Online Direct Check payment service by going to http:// address . . . ".

In another embodiment of the present invention, a functionality for check processing may be provided by the system. The backend for the present verification system is also capable of doing a new Automated ClearingHouse (ACH) funds transfer process. By getting the bank routing number and account number off of a check, funds can be transferred from the customer's account do operate with checks without requiring a printed check. Some merchants currently use a process where they may handle electronic payment by check but they are actually waiting for a real check. The processing costs associated with handling paper in this way could exceed that of credit cards. By utilizing the ACH/Direct Check method from the verification server, they could significantly reduce this cost, as well as offering another payment option to entice their customers. This is by far the cheapest option in terms of transaction costs. For an insurance company, it is actually cheaper than handling paper checks.

An additional feature of the system may incorporate an escrow option. The money for a transaction may be held in the verification system escrow account for a specified number of days and/or the customer must confirm receiving the goods before the money is released to the merchant's account.

System Advantages the merchant never gets the PIN number.

the information to complete a transaction can never be intercepted by "eavesdropping" on any one channel of the communications between customer, merchant, or verification system.

the verification system is trusted because the verification system conforms to the requirements of the different backbone processors.

the net address of both the merchant and the customer may be held for use in fraud cases, however, the verification system would not be a party to the transaction done on behalf of the merchant.

Other Benefits of the System

Many debit cards are also associated with major credit card companies in such a way that they can also be used as credit cards. We can enhance the security of using these cards for debit card transactions, by requiring that the merchant NOT request all of the numbers of the card and its expiration date, thus minimizing the possibility that the debit card can be used in an unauthorized credit card transaction. This makes the cards more easily managed and more secure than typical credit card transactions. For example, a merchant cannot make an unauthorized credit card transaction without the full account number and the expiration date. For debit card transactions this date is not required, instead the customer is the only person with enough information to respond to the query for the PIN number. The merchant never has the pieces to do a debit transaction without the user entering the pin on the verification server site.

Internet merchants are paying 2.2 to 6% to a clearinghouse organization to take credit cards over the Internet. This is referred to as the non-swiped rate (the card is not physically available to run through a terminal.) The rate is higher due to the potential for fraud. Because the present system will be able to provide the PIN number, therefore proving to a greater extent that the customer is in actual possession of the card, a more favorable processing rate can be negotiated. The system of the present invention can therefore give the merchant the chance to decrease their transaction costs.

The verification system subscribers such as preferred merchants would benefit greatly from making the distinction up front between debit and credit cards. For example, one potential customer uses a typical order page that looks like the sample shown in FIG. 5. By changing the page to include a debit card field, the transactions form would look more like FIG. 6. Based on the preferential physical placement of the debit card information, it would be more likely that a customer would choose the debit option. The user may benefit if part of the cost savings are passed onto them and the merchant would see a reduction in transaction costs.

The customer computing device may alternatively be a device located at a retail location. For example, the user may use their debit card at the point of sale by swiping the card through a reader, then enter their PIN number on a separate system that is connected with the verification system of the present invention. The Internet-based verification step would be executed as a separate application having no direct connection to the merchant transaction. This would of course require a shift in the merchant's and customer's paradigm of their understanding of a point-of sale system. The separate components may be provided to allow the customer to establish a communication link to the verification system, where once connected, the customer may provide the remaining information to complete the transaction without communicating with the point of sale system.

We claim:

1. A method of approving an online transaction between a user computer and a merchant computer interconnected over a computer network, in conjunction with a payment card associated with the user computer, comprising the steps of:

a) transmitting a transaction request from the user computer to the merchant computer, b) transmitting a verification request from the merchant computer to a verification computer, the verification request comprising a first data string associated with the payment card;

c) storing the verification request at the verification computer in association with a transaction identifier and a verification data string;

d) transmitting the transaction identifier and the verification data string from the verification computer to the merchant computer;

e) storing at the merchant computer (i) the verification data string as an expected verification data string, and (ii) the transaction identifier;

f) transmitting from the merchant computer to the user computer the transaction identifier;

g) the user computer transmitting to the verification computer (i) the transaction identifier, and (ii) a second data string associated with the payment card;

h) the verification computer using the transaction identifier received from the user computer to retrieve the verification request previously stored by the verification computer with that received transaction identifier;

i) the verification computer performing a verification step by using the first data string associated with the payment card retrieved from storage and the second data string associated with the payment card received from the user computer to verify if the transaction should be approved;

j) upon successful verification that the transaction should be approved, the verification computer transmitting a verification approval message to the user computer, the verification approval message comprising the transaction identifier and the verification data string associated therewith as a confirmation verification data string;

k) the user computer transmitting the verification approval message to the merchant computer;

l) the merchant computer using the transaction identifier in the verification approval message to retrieve an expected verification data string previously stored;

m) the merchant computer comparing the expected verification data string with the confirmation verification data string from the verification approval message; and n) the merchant computer indicating that the transaction has been approved if the comparison is positive.

2. The method of claim 1 wherein the verification request transmitted from the merchant computer to the verification computer further comprises an indication of a payment amount associated with the transaction request.

3. The method of claim 2 wherein the verification step performed by the verification computer determines if an account associated with the payment card is sufficient to cover the payment amount in the verification request.

4. The method of claim 3 wherein the transaction request comprises information associated with a product to be purchased by the user computer and the payment amount associated with the product.

5. The method of claim 4 wherein the payment card is a debit card.

6. The method of claim 5 wherein the first data string is an account number associated with the debit card, and wherein the second data string is a PIN associated with the debit card.

7. The method of claim 4 wherein the payment card is a credit card.

8. The method of claim 7 wherein the first data string is an account number associated with the credit card.

9. The method of claim 8 wherein the second data string is an expiration date associated with the credit card.

10. The method of claim 8 wherein the second data string is a CVV2 number associated with the credit card.

11. The method of claim 1 wherein the verification request transmitted from the merchant computer to the verification computer further comprises a merchant identifier.

12. The method of claim 1 wherein the transaction identifier is generated by the verification computer.

13. The method of claim 1 wherein the verification data string is generated by the verification computer.

14. The method of claim 1 wherein the user computer is executing a web browser program, and wherein the user computer is caused to transmit to the verification computer (i) the transaction identifier, and (ii) a second data string associated with the payment card, by a redirect command sent from the merchant computer to the user computer.

15. The method of claim 1 wherein the user computer is executing a web browser program, and wherein the user computer is caused to transmit the verification approval message to the merchant computer by a redirect command sent from the verification computer to the user computer.

16. The method of claim 1 wherein the step of the user computer transmitting to the verification computer (i) the transaction identifier, and (ii) a second data string associated with the payment card, comprises the steps of:

the user computer transmitting the transaction identifier to the verification computer;

the verification computer requesting the user computer to transmit the second data string to the verification computer; and the user computer transmitting the second data string to the verification computer in response thereto.

17. The method of claim 16 wherein the verification computer requests the user computer to transmit the second data string to the verification computer by sending a form to a browser program executing on the user computer, the form comprising a data entry field used by an operator of the user computer to enter the requested second data string.

18. The method of claim 3 wherein the step of determining if an account associated with the payment card is sufficient to cover the payment amount in the verification request comprises the step of the verification computer communicating with a gateway computer associated with an existing credit approval system.

19. The method of claim 1 wherein the first data string associated with the payment card is obtained by the merchant computer as part of the transaction request transmitted by the user computer.

20. The method of claim 1 wherein the first data string associated with the payment card is obtained by the merchant computer by retrieval from storage.

21. A system for approving an online transaction comprising:

a) a user computer;

b) a merchant computer; and c) a verification computer;

said user computer, said merchant computer, and said verification computer are interconnected to a computer network;

wherein said online transaction is executed in conjunction with a payment card associated with said user computer; and further wherein:

a) said user computer is programmed to transmit a transaction request to the merchant computer;

b) said merchant computer is programmed to transmit a verification request to the verification computer, the verification request comprising a first data string associated with the payment card;

c) said verification computer is programmed to (i) store the verification request in association with a transaction identifier and a verification data string, and (ii) transmit the transaction identifier and the verification data string to the merchant computer;

d) said merchant computer is further programmed to store (i) the verification data string as an expected verification data string, and (ii) the transaction identifier, and to transmit to the user computer the transaction identifier;

e) said user computer user computer is further programmed to transmit to the verification computer (i) the transaction identifier, and (ii) a second data string associated with the payment card;

f) said verification computer is further programmed to (i) use the transaction identifier received from the user computer to retrieve the verification request previously stored with that received transaction identifier, to (ii) perform a verification step by using the first data string associated with the payment card retrieved from storage and the second data string associated with the payment card received from the user computer to verify if the transaction should be approved, to (iii) transmit, upon successful verification that the transaction should be approved, a verification approval message to the user computer, the verification approval message comprising the transaction identifier and the verification data string associated therewith as a confirmation verification data string;

g) said user computer is further programmed to transmit the verification approval message to the merchant computer;

h) said merchant computer is further programmed to (i) use the transaction identifier in the verification approval message to retrieve an expected verification data string previously stored, to (ii) compare the expected verification data string with the confirmation verification data string from the verification approval message, and to (iii) indicate that the transaction has been approved if the comparison is positive.

22. The system of claim 21 wherein the verification request transmitted from the merchant computer to the verification computer further comprises an indication of a payment amount associated with the transaction request.

23. The system of claim 22 wherein the verification computer is programmed to perform the verification step by determining if an account associated with the payment card is sufficient to cover the payment amount in the verification request.

24. The system of claim 23 wherein the transaction request comprises information associated with a product to be purchased by the user computer and the payment amount associated with the product.

25. The system of claim 24 wherein the payment card is a debit card.

26. The system of claim 25 wherein the first data string is an account number associated with the debit card, and wherein the second data string is a PIN associated with the debit card.

27. The system of claim 24 wherein the payment card is a credit card.

28. The system of claim 27 wherein the first data string is an account number associated with the credit card.

29. The system of claim 28 wherein the second data string is an expiration date associated with the credit card.

30. The system of claim 28 wherein the second data string is a CVV2 number associated with the credit card.

31. The system of claim 21 wherein the verification request transmitted from the merchant computer to the verification computer further comprises a merchant identifier.

32. The system of claim 21 wherein the verification computer is programmed to generate the transaction identifier.

33. The system of claim 21 wherein the verification computer is programmed to generate the verification data string.

34. The system of claim 21 wherein the user computer is further programmed to execute a web browser program, and wherein the user computer is caused to transmit to the verification computer (i) the transaction identifier, and (ii) a second data string associated with the payment card, by a redirect command sent from the merchant computer to the user computer.

35. The system of claim 21 wherein the user computer is further programmed to execute a web browser program, and wherein the user computer is caused to transmit the verification approval message to the merchant computer by a redirect command sent from the verification computer to the user computer.

36. The system of claim 21 wherein the user computer is programmed to transmit to the verification computer (i) the transaction identifier, and (ii) a second data string associated with the payment card, by a process executing the steps of comprises the steps of:

the user computer transmitting the transaction identifier to the verification computer;

the verification computer requesting the user computer to transmit the second data string to the verification computer; and the user computer transmitting the second data string to the verification computer in response thereto.

37. The system of claim 36 wherein the verification computer requests the user computer to transmit the second data string to the verification computer by sending a form to a browser program executing on the user computer, the form comprising a data entry field used by an operator of the user computer to enter the requested second data string.

38. The system of claim 23 wherein the step of determining if an account associated with the payment card is sufficient to cover the payment amount in the verification request comprises the step of the verification computer communicating with a gateway computer associated with an existing credit approval system.

39. The system of claim 21 wherein the first data string associated with the payment card is obtained by the merchant computer as part of the transaction request transmitted by the user computer.

40. The system of claim 21 wherein the first data string associated with the payment card is obtained by the merchant computer by retrieval from storage.

41. A method of a merchant computer obtaining approval from a verification computer of an online transaction requested by a user computer in conjunction with a payment card associated with the user computer, comprising the steps of:

a) on receipt of a transaction request, the merchant computer transmitting a verification request to the verification computer, the verification request comprising a first data string associated with the payment card;

b) storing the verification request at the verification computer in association with a transaction identifier and a verification data string;

c) transmitting the transaction identifier and the verification data string from the verification computer to the merchant computer;

d) storing at the merchant computer (i) the verification data string as an expected verification data string, and (ii) the transaction identifier;

e) transmitting the transaction identifier from the merchant computer to the verification computer via the user computer;

f) the verification computer obtaining from the user computer a second data string associated with the payment card;

g) the verification computer using the transaction identifier received from the merchant computer via the user computer to retrieve the verification request previously stored by the verification computer with that received transaction identifier;

h) the verification computer performing a verification step by using the first data string associated with the payment card retrieved from storage and the second data string associated with the payment card received from the user computer to verify if the transaction should be approved;

i) upon successful verification that the transaction should be approved, the verification computer transmitting a verification approval message to the merchant computer via the user computer, the verification approval message comprising the transaction identifier and the verification data string associated therewith as a confirmation verification data string;

j) the merchant computer using the transaction identifier in the verification approval message to retrieve an expected verification data string previously stored;

k) the merchant computer comparing the expected verification data string with the confirmation verification data string from the verification approval message; and l) the merchant computer indicating that the transaction has been approved if the comparison is positive.

42. The method of claim 41 wherein the verification request transmitted from the merchant computer to the verification computer further comprises an indication of a payment amount associated with the transaction request.

43. The method of claim 42 wherein the verification step performed by the verification computer determines if an account associated with the payment card is sufficient to cover the payment amount in the verification request.

44. The method of claim 43 wherein the transaction request comprises information associated with a product to be purchased by the user computer and the payment amount associated with the product.

45. The method of claim 44 wherein the payment card is a debit card.

46. The method of claim 45 wherein the first data string is an account number associated with the debit card, and wherein the second data string is a PIN associated with the debit card.

47. The method of claim 44 wherein the payment card is a credit card.

48. The method of claim 47 wherein the first data string is an account number associated with the credit card.

49. The method of claim 48 wherein the second data string is an expiration date associated with the credit card.

50. The method of claim 48 wherein the second data string is a CVV2 number associated with the credit card.

51. The method of claim 41 wherein the verification request transmitted from the merchant computer to the verification computer further comprises a merchant identifier.

52. The method of claim 41 wherein the transaction identifier is generated by the verification computer.

53. The method of claim 41 wherein the verification data string is generated by the verification computer.

54. The method of claim 41 wherein transaction identifier is transmitted from the merchant computer to the verification computer via the user computer by the merchant computer issuing a redirect command to the user computer.

55. The method of claim 41 wherein the verification approval message is transmitted from the verification computer to the merchant computer via the user computer by the verification computer issuing a redirect command to the user computer.

56. The method of claim 41 wherein the verification computer obtains the second data string associated with the payment card by a request issued to the user computer.

57. The method of claim 56 wherein the verification computer requests the user computer to transmit the second data string to the verification computer by sending a form to a browser program executing on the user computer, the form comprising a data entry field used by an operator of the user computer to enter the requested second data string.

58. The method of claim 43 wherein the step of determining if an account associated with the payment card is sufficient to cover the payment amount in the verification request comprises the step of the verification computer communicating with a gateway computer associated with an existing credit approval system.

59. The method of claim 41 wherein the first data string associated with the payment card is obtained by the merchant computer as part of the transaction request.

60. The method of claim 41 wherein the first data string associated with the payment card is obtained by the merchant computer by retrieval from storage.

61. A system for approving an online transaction comprising:

a) a merchant computer; and b) a verification computer;

said merchant computer and said verification computer are interconnected to a computer network;

wherein said online transaction is executed in conjunction with a payment card; and further wherein:

a) said merchant computer is programmed to receive a transaction request and in response thereto transmit a verification request to the verification computer, the verification request comprising a first data string associated with the payment card;

b) said verification computer is programmed to (i) store the verification request in association with a transaction identifier and a verification data string, and (ii) transmit the transaction identifier and the verification data string to the merchant computer;

c) said merchant computer is further programmed to store (i) the verification data string as an expected verification data string, and (ii) the transaction identifier, and to transmit the transaction identifier to the verification computer via a user computer interconnected to the computer network;

d) said verification computer is further programmed to (i) use the transaction identifier received from the merchant computer via the user computer to retrieve the verification request previously stored with that received transaction identifier, (ii) obtain a second data string associated with the payment card from a user computer (iii) perform a verification step by using the first data string associated with the payment card retrieved from storage and the second data string associated with the payment card received from the user computer to verify if the transaction should be approved, to (iv) transmit, upon successful verification that the transaction should be approved, a verification approval message to the merchant computer via the user computer, the verification approval message comprising the transaction identifier and the verification data string associated therewith as a confirmation verification data string;

e) said merchant computer is further programmed to (i) use the transaction identifier in the verification approval message to retrieve an expected verification data string previously stored, to (ii) compare the expected verification data string with the confirmation verification data string from the verification approval message, and to (iii) indicate that the transaction has been approved if the comparison is positive.

62. The system of claim 61 wherein the verification request transmitted from the merchant computer to the verification computer further comprises an indication of a payment amount associated with the transaction request.

63. The system of claim 62 wherein the verification computer is programmed to perform the verification step by determining if an account associated with the payment card is sufficient to cover the payment amount in the verification request.

64. The system of claim 63 wherein the transaction request comprises information associated with a product to be purchased by the user computer and the payment amount associated with the product.

65. The system of claim 64 wherein the payment card is a debit card.

66. The system of claim 65 wherein the first data string is an account number associated with the debit card, and wherein the second data string is a PIN associated with the debit card.

67. The system of claim 64 wherein the payment card is a credit card.

68. The system of claim 67 wherein the first data string is an account number associated with the credit card.

69. The system of claim 68 wherein the second data string is an expiration date associated with the credit card.

70. The system of claim 68 wherein the second data string is a CVV2 number associated with the credit card.

71. The system of claim 61 wherein the verification request transmitted from the merchant computer to the verification computer further comprises a merchant identifier.

72. The system of claim 61 wherein the verification computer is programmed to generate the transaction identifier.

73. The system of claim 61 wherein the verification computer is programmed to generate the verification data string.

74. The system of claim 61 wherein the merchant computer is programmed to transmit the transaction identifier to the verification computer via the user computer by issuing a redirect command to the user computer.

75. The system of claim 61 wherein the verification computer is programmed to transmit the verification approval message to the merchant computer via the user computer by issuing a redirect command to the user computer.

76. The system of claim 61 wherein the verification computer is programmed to obtain the second data string associated with the payment card by a request issued to the user computer.

77. The system of claim 76 wherein the verification computer requests the user computer to transmit the second data string to the verification computer by sending a form to a browser program executing on the user computer, the form comprising a data entry field used by an operator of the user computer to enter the requested second data string.

78. The system of claim 63 wherein the step of determining if an account associated with the payment card is sufficient to cover the payment amount in the verification request comprises the step of the verification computer communicating with a gateway computer associated with an existing credit approval system.

79. The system of claim 61 wherein the first data string associated with the payment card is obtained by the merchant computer as part of the transaction request transmitted by the user computer.

80. The system of claim 61 wherein the first data string associated with the payment card is obtained by the merchant computer by retrieval from storage.

81. A method of a verification computer approving an online transaction between a user computer and a merchant computer interconnected over a computer network, in conjunction with a payment card associated with the user computer, comprising the steps of:

a) receiving a verification request from the merchant computer, the verification request comprising a first data string associated with the payment card;

b) storing the verification request in association with a transaction identifier and a verification data string;

c) transmitting the transaction identifier and the verification data string to the merchant computer;

d) receiving from the user computer (i) the transaction identifier, said transaction identifier having been previously transmitted from the merchant computer to the user computer, and (ii) a second data string associated with the payment card;

e) using the transaction identifier received from the user computer to retrieve the verification request previously stored with that received transaction identifier;

f) performing a verification step by using the first data string associated with the payment card retrieved from storage and the second data string associated with the payment card received from the user computer to verify if the transaction should be approved; and g) upon successful verification that the transaction should be approved, transmitting a verification approval message to the user computer, the verification approval message comprising the transaction identifier and the verification data string associated therewith as a confirmation verification data string;

whereby upon receipt of the verification approval message, and the user computer transmitting the verification approval message to the merchant computer, and the merchant computer using the transaction identifier in the verification approval message to retrieve an expected verification data string previously stored;

and the merchant computer comparing the expected verification data string with the confirmation verification data string from the verification approval message; then the merchant computer indicates that the transaction has been approved if the comparison is positive.

82. The method of claim 81 wherein the verification request received by the verification computer further comprises an indication of a payment amount associated with the transaction request.

83. The method of claim 82 wherein the verification step determines if an account associated with the payment card is sufficient to cover the payment amount in the verification request.

84. The method of claim 81 wherein the payment card is a debit card.

85. The method of claim 84 wherein the first data string is an account number associated with the debit card, and wherein the second data string is a PIN associated with the debit card.

86. The method of claim 81 wherein the payment card is a credit card.

87. The method of claim 86 wherein the first data string is an account number associated with the credit card.

88. The method of claim 87 wherein the second data string is an expiration date associated with the credit card.

89. The method of claim 87 wherein the second data string is a CVV2 number associated with the credit card.

90. The method of claim 81 wherein the verification request received by the verification computer further comprises a merchant identifier.

91. The method of claim 81 wherein the transaction identifier is generated by the verification computer.

92. The method of claim 81 wherein the verification data string is generated by the verification computer.

93. The method of claim 81 wherein the step of receiving from the user computer (i) the transaction identifier, and (ii) a second data string associated with the payment card comprises:

the verification computer receiving the transaction identifier from the user computer;

the verification computer requesting the user computer to transmit the second data string to the verification computer; and the verification computer receiving the second data string from the user computer in response thereto.

94. The method of claim 93 wherein the verification computer requests the user computer to transmit the second data string to the verification computer by sending a form to a browser program executing on the user computer, the form comprising a data entry field used by an operator of the user computer to enter the requested second data string.

95. The method of claim 83 wherein the step of determining if an account associated with the payment card is sufficient to cover the payment amount in the verification request comprises the step of communicating with a gateway computer associated with an existing credit approval system.

96. A verification computer for approving an online transaction between a user computer and a merchant computer, comprising:

means for communicating with each of the user computer and the merchant computer over a computer network;

processing means programmed to:

a) receive a verification request from a merchant computer, the verification request comprising a first data string associated with the payment card;

b) store the verification request in association with a transaction identifier and a verification data string;

c) transmit the transaction identifier and the verification data string to the merchant computer;

d) receive from the user computer (i) the transaction identifier, said transaction identifier having been previously transmitted from the merchant computer to the user computer, and (ii) a second data string associated with the payment card;

e) use the transaction identifier received from the user computer to retrieve the verification request previously stored with that received transaction identifier;

f) perform a verification step by using the first data string associated with the payment card retrieved from storage and the second data string associated with the payment card received from the user computer to verify if the transaction should be approved; and g) upon successful verification that the transaction should be approved, transmit a verification approval message to the user computer, the verification approval message comprising the transaction identifier and the verification data string associated therewith as a confirmation verification data string;

whereby upon receipt of the verification approval message, and the user computer transmitting the verification approval message to the merchant computer, and the merchant computer using the transaction identifier in the verification approval message to retrieve an expected verification data string previously stored;

and the merchant computer comparing the expected verification data string with the confirmation verification data string from the verification approval message; then the merchant computer indicates that the transaction has been approved if the comparison is positive.

97. The verification computer of claim 96 wherein the processing means is further programmed to utilize an indication of a payment amount associated with a transaction request.

98. The verification computer of claim 97 wherein the processing means is further programmed to determine if an account associated with the payment card is sufficient to cover the payment amount in the verification request.

99. The verification computer of claim 96 wherein the processing means is further programmed to receive the transaction identifier from the user computer; to request the user computer to transmit the second data string to the verification computer; and to receive the second data string from the user computer in response thereto.

100. The verification computer of claim 99 wherein the processing means is further programmed to request the user computer to transmit the second data string to the verification computer by sending a form to a browser program executing on the user computer, the form comprising a data entry field used by an operator of the user computer to enter the requested second data string.

101. The verification computer of claim 98 wherein the processing means is further programmed to determine if an account associated with the payment card is sufficient to cover the payment amount in the verification request by communicating with a gateway computer associated with an existing credit approval system.

102. A method of a merchant computer obtaining approval for an online transaction between a user computer and the merchant computer in conjunction with a payment card associated with the user computer, comprising the steps of:

a) receiving a transaction request from the user computer;

b) transmitting a verification request to a verification computer, the verification request comprising a first data string associated with the payment card;

c) receiving from the verification computer a transaction identifier and a verification data string;

d) storing (i) the verification data string as an expected verification data string, and (ii) the transaction identifier;

e) transmitting to the verification computer via the user computer the transaction identifier;

f) receiving from the verification computer via the user computer a verification approval message, the verification approval message comprising the transaction identifier and a verification data string associated therewith as a confirmation verification data string;

g) using the transaction identifier in the verification approval message to retrieve an expected verification data string previously stored;

h) comparing the expected verification data string with the confirmation verification data string from the verification approval message; and i) indicating that the transaction has been approved if the comparison is positive.

103. The method of claim 102 wherein the verification request transmitted to the verification computer further comprises an indication of a payment amount associated with the transaction request.

104. The method of claim 103 wherein the transaction request comprises information associated with a product to be purchased by the user computer and the payment amount associated with the product.

105. The method of claim 102 wherein the verification request transmitted from the merchant computer to the verification computer further comprises a merchant identifier.

106. The method of claim 102 wherein the transaction identifier is generated by the verification computer.

107. The method of claim 102 wherein the verification data string is generated by the verification computer.

108. The method of claim 102 wherein the step of transmitting to the verification computer via the user computer the transaction identifier comprises sending a redirect command to the user computer.

109. The method of claim 102 wherein the first data string associated with the payment card is obtained by the merchant computer as part of the transaction request transmitted by the user computer.

110. The method of claim 102 wherein the first data string associated with the payment card is obtained by the merchant computer by retrieval from storage.

111. A merchant computer for executing an online transaction with a user computer on approval by a verification computer, comprising:

means for communicating with each of the user computer and the verification computer over a computer network;

processing means programmed to:

a) receive a transaction request from the user computer;

b) transmit a verification request to the verification computer, the verification request comprising a first data string associated with the payment card;

c) receive from the verification computer a transaction identifier and a verification data string;

d) store (i) the verification data string as an expected verification data string, and (ii) the transaction identifier;

e) transmit to the verification computer via the user computer the transaction identifier;

f) receive from the verification computer via the user computer a verification approval message, the verification approval message comprising the transaction identifier and a verification data string associated therewith as a confirmation verification data string;

g) use the transaction identifier in the verification approval message to retrieve an expected verification data string previously stored;

h) comparing the expected verification data string with the confirmation verification data string from the verification approval message; and i) indicating that the transaction has been approved if the comparison is positive.

112. The merchant computer of claim 111 wherein the processing means is further programmed to include in the verification request transmitted to the verification computer an indication of a payment amount associated with the transaction request.

113. The merchant computer of claim 111 wherein the processing means is further programmed to transmitting to the verification computer via the user computer the transaction identifier by sending a redirect command to the user computer.

* * * * *